Patented Feb. 13, 1923.

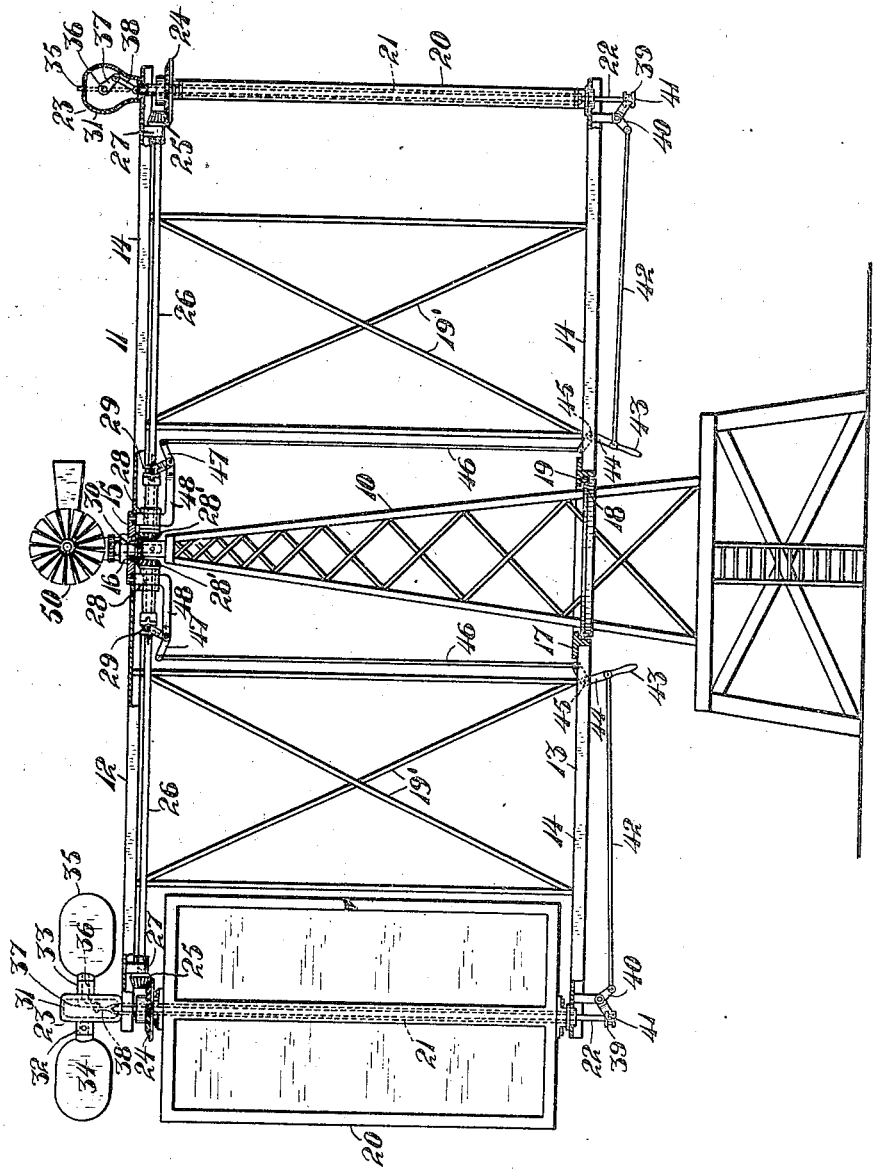

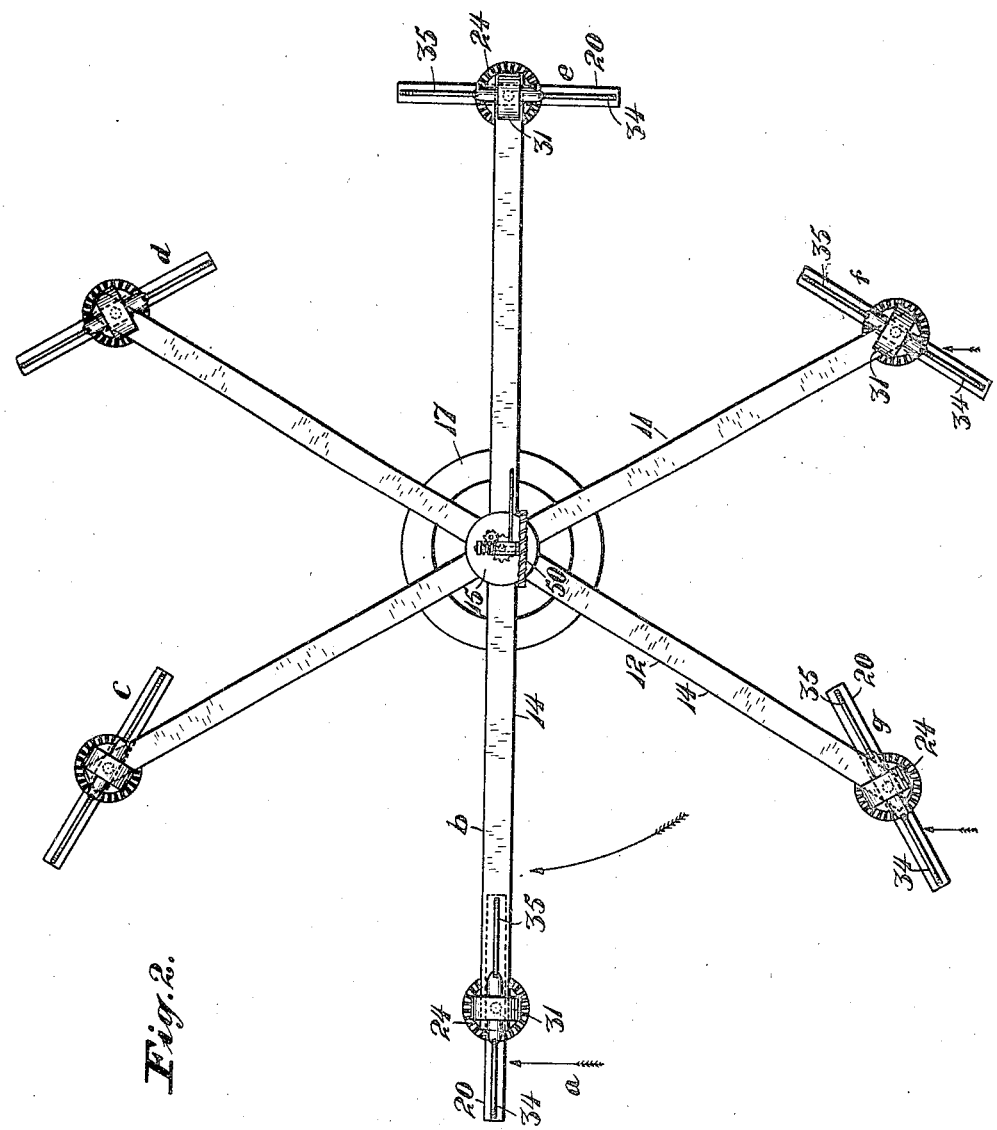

1,445,367

UNITED STATES PATENT OFFICE.

FRANK A. STIRTAN, OF SAN FRANCISCO, CALIFORNIA.

WIND WHEEL.

Application filed April 10, 1919, Serial No. 288,920. Renewed September 30, 1921. Serial No. 504,497.

*To all whom it may concern:*

Be it known that I, FRANK A. STIRTAN, a citizen of the United States, residing at San Francisco, in the county of San Francisco and State of California, have invented new and useful Improvements in Wind Wheels, of which the following is a specification.

The principal object of this invention is to provide a wind wheel, the sails of which will automatically be presented to the force of the wind and may be conveniently adjusted so that the operation of the sail moving means will bear a direct relation to the path of travel of the wind, thus making it possible to obtain a maximum efficiency from the operation of the wind wheel and to convert a maximum amount of the force of the wind into power.

The present invention contemplates the use of a vertically pivoted rotor carrying a plurality of sails, which sails act in synchronism as the rotor revolves and assume various positions in relation to the wind to present the maximum sail surface to the force of the wind at all times, said synchronizing means being adapted to be rendered inoperative and to permit automatic adaptation of the sails to the direction of the wind travel.

The invention is illustrated by way of example in the accompanying drawings, in which—

Fig. 1 is a view in vertical section and elevation through the wind wheel, showing the rotor construction and the synchronizing means connecting the sails.

Fig. 2 is a view in plan, illustrating the wind wheel in operation and disclosing the cooperative positions of the various sails, as controlled by the synchronizing means.

Referring to the drawings, 10 indicates a suitable tower, preferably formed of structural steel elements and carrying a wind wheel or rotor 11. This rotor is formed with an upper spider 12 and a lower spider 13, which spiders consist of a plurality of spokes 14. The spokes are preferably made of structural metal, channel-shaped in cross section and in the present instance are indicated as being six in number. The upper set of spokes are secured together by a hub plate 15 and suitable re-enforcing members, which will hold the spider 12 in a rigid condition and permit it to rotate upon a ball-race 16, carried at the upper end of the tower 10. The lower spider 13 is formed with a hub ring 17 circumscribing the tower and moving around a race-way 18 fixed to the tower, anti-friction bearing members 19 being interposed between the members 17 and 18. The spiders 12 and 13 are suitably cross-braced by members 19' and thus form a rigid rotor for carrying sails 20. In the present instance, these sails are rectangular in shape and are formed with a flat surface, against which the wind may strike. The sails extend vertically and are rotatably mounted between the ends of spokes 14 upon a tubular shaft 21. This shaft accommodates a central push rod 22, which extends through the opposite ends of the shaft and operates a sail adjusting mechanism 23 which will be hereinafter described.

Fixed concentric to each shaft 21 and to the upper end of each sail 20, is a bevel gear 24. These gears are in mesh with complementary bevel pinions 25 carried upon synchronizing shafts 26. The shafts 26 are hung from bearings 27 and 28, fixed to the channel-shaped spokes 14 of the spider 12. The inner ends of the shafts carry pinions 28' which are keyed on the shafts and have clutches which may be reciprocated therealong by shifting the sleeve 29. The pinions 28' are in mesh with a normally fixed bevel gear 30 secured on the upper end of the tower 10, and around which gear the pinions have a planetary action. The pinions 25 and 28' are preferably of the same diameter, while the pinions 24 and 30 are of a ratio of two to one, thus making it possible for the wind wheel to rotate twice to each revolution of the sails, this action causing the sails to assume the positions shown in Fig. 2 of the drawings during one rotation of the rotor and causing the opposite sides of the sails to be presented to the wind in the same angular positions during the second rotation of the rotor. Mounted upon the upper end of each of the spokes of the spider 12, is a casing 31. This casing carries bearings 32 and 33 which are longitudinally and horizontally aligned and from which bearing vanes 34 and 35 are supported. The vane 34 is fixed in relation to the bearing 32 and the vane 35 is provided to rotate around a horizontal axis, as supported by the bearing 33. The vane 35 is directly mounted upon a shaft 36 extending through the bearing 33 and carrying a crank 37 on its inner end. This crank connects with a link 38, the link in turn being pivoted to the upper end of the push rod 22. The lower end of the push rod 22 is fitted with a grooved collar 39, actuated by a bell crank 40 and the bell crank 40 carries a pin 41 projecting into the groove of the collar and by which the collar may be lifted or lowered, as desired. The opposite arm of the bell crank is connected with an operating rod 42 extending inwardly beneath the spoke 14 of spider 13 and secured to an operating lever 43. This lever is formed as a continuation of one arm of a bell crank 44 which is carried upon a pivot pin 45 secured to the spoke 14. The opposite leg of the bell crank operates a vertically extending shifting rod 46, connected to a gear shifting crank 47 which is supported from the bearing 28 upon an arm 48.

The crank 47 engages a groove on the sleeve 29 and thus makes it possible to slide the gear 28 into and out of mesh with the fixed gear 30. It is to be understood that while the adjusting mechanism 23 and the linkage connecting with said mechanism and the gear 28 is described for one unit, that these units are provided for each of the sails for the control of the same.

Reference being had to Fig. 2, the operation of the wind wheel will be readily understood, it being understood that the wind is blowing in the direction of the arrow $a$. The wind will strike the broad side of sail 20 on the arm $b$ and will force the wheel to rotate away from the wind and around the central vertical axis of the tower. As the wind wheel rotates, the sails will successively assume the positions indicated at $c$, $d$, $e$, $f$ and $g$. By a comparison of these different positions, it will be noted that the sails at $c$ and $g$ are inclined at opposite angles to each other and equal angles to the path of travel of the wind. Thus, the wind will strike the front face of the sail $g$ to move the sail into the position assumed at $b$ and the wind will strike the face of the sail $c$ to move it to the position assumed at $d$. A like condition will exist between the sails $d$ and $f$ while the sail indicated at $e$, which is upon the diametrically opposite side from the sail at $b$, will stand at right angles to the sail at $b$ and will present practically no resistance to the wind.

In the event that the wind changes its direction of travel, it will be necessary to readjust the sails so that the sail at $b$ will be presented directly to the force of the wind. This is done by successively operating the levers 43 to shift the gears 28 out of mesh with the gear 30 or by a regulating mechanisms as indicated at 50. Simultaneous with this operation, the push rods 22 will be moved upwardly and will rotate the vanes 35 to cause them to assume positions in a horizontal plane. This action will cause an unbalanced condition upon each sail, due to the added wind surface of the vane 34 and this will swing the vane around parallel to the path of travel of the wind.

All of the sails will be freed by the operation of their levers 43 and all will stand parallel while the rotor operates. As the sails reach the position indicated at $e$ in Fig. 2, the levers 43 are moved to shift the gears 28 into mesh with the gear 30 and to swing the vanes 35 to the position shown in Fig. 1, thus successively throwing the sails into synchronism with the master gear 30 and causing them to operate and assume the successive positions shown in Fig. 2.

It will thus be seen that due to the arrangement here shown, the various sails of the wind wheel will be caused to assume proper angular relation to the wind force to insure a maximum absorption of power by the wind wheel, which power may be transmitted from the wheel by any desired means. It will also be observed that a simple means is provided for adjusting the wind wheel to various changes in the direction of wind travel, thus insuring a constant operation of the wind wheel under varying conditions.

Having thus described my invention, what I claim and desire to secure by Letters Patent is—

1. A wind wheel comprising a vertical tower, a rotor revolving around the vertical axis thereof, a plurality of sails distributed around the circumference of said rotor and mounted for individual rotation upon vertical axes, a master gear carried by the tower, a secondary gear carried by each of said sails, operating means therebetween, whereby movement of the tower will produce simultaneous rotation of the sails, push rods slidable through the hollow shafts of said sails, lever connections and sail adjusting means adapted to accommodate to move the sails into parallel relation to each other and the path of travel of the wind, and control means for simultaneously disconnecting the sails from the master gear and for throwing the adjusting means into operation.

2. In a wind propelled wheel of the character described, a vertical tower, a rotor revoluble about the vertical axis thereof, radial arms each carrying a centrally vertically journaled sail, a stationary master gear fixed to the tower, radial shafts and bevel gears at each end, engageable to transmit motion between the central gear and the outer arms, hollow shafts to which the sails are connected, push rods slidable through the sail shafts having bevel gears engageable with those of the radial shafts, bell crank levers connecting with the lower ends of the push rods, connecting rods and hand levers near the center of the rotor by which the push rods may be individually raised or lowered.

3. In a wind propelled wheel of the character described, a vertical tower, a rotor revoluble about the vertical axis thereof, radial arms each carrying a centrally vertically journaled sail, a stationary master gear fixed to the tower, radial shafts and bevel gears at each end, engageable to transmit motion between the central gear and the outer arms, hollow shafts to which the sails are connected, push rods slidable through the sail shafts having bevel gears engageable with those of the radial shafts, bell crank levers connecting with the lower ends of the push rods, connecting rods and hand levers near the center of the rotor by which the push rods may be individually raised or lowered, casings mounted on the outer ends of the radial arms, vanes upon opposite sides of the casing, one of which is fixed and the other turnable upon a horizontal axis, a crank arm and a link connecting each of said crank arms with the push rod of its sail.

4. A wind wheel comprising a tower, a rotor revolving around the axis thereof, a plurality of sails distributed around the circumference of said rotor and mounted for individual rotation upon parallel axes, a master gear carried by the tower, a secondary gear carried by each of said sails, operating means therebetween, whereby movement of the rotor will produce simultaneous rotation of the sails, adjusting means adapted to move the sails into parallel relation to each other and the path of travel of the wind, and control means for simultaneously disconnecting the sails from the master gear and for throwing the adjusting means into operation.

5. In a wind propelled wheel of the character described, a vertical tower, a rotor revoluble about the vertical axis thereof, radial arms each carrying a vertically journaled sail, a stationary master gear fixed to the tower, radial shafts and bevel gears at each end, engageable to transmit motion from the central gear to the outer arms, hollow shafts to which the sails are connected, push rods slidable through the sail shafts having bevel gears engageable with those of the radial shafts, and means by which the push rods may be individually raised or lowered.

6. A wind wheel comprising a base, a rotor pivotally mounted thereon for horizontal rotation, a plurality of sails carried by the rotor and pivotally mounted parallel to the axis of the rotor, optionally controlled means for setting the sails in ineffective positions relative to a current of air and means for causing the sails to positively swing as the rotor turns.

7. A windwheel comprising a rotor turnable about a vertical axis, a plurality of sails carried by the rotor and operating about vertical axis operative means connecting the sails to produce synchronism of operation of said sails during the revolution of the rotor, and means for setting said sails in an effective position relative to a current of air.

In testimony whereof I have hereunto set my hand in the presence of two subscribing witnesses.

FRANK A. STIRTAN.

Witnesses:
W. W. HEALEY,
M. E. EWING.